United States Patent
Jang et al.

(10) Patent No.: US 11,916,207 B2
(45) Date of Patent: Feb. 27, 2024

(54) BATTERY CELL INCLUDING SEALING TAPE FOR ACCELERATING HEAT CONDUCTION

(71) Applicant: LG CHEM, LTD., Seoul (KR)

(72) Inventors: Wook Hee Jang, Daejeon (KR); Sang Sok Jung, Daejeon (KR); Sangjoon Park, Daejeon (KR); Roun Kim, Daejeon (KR); Gilyoung Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 259 days.

(21) Appl. No.: 16/605,334

(22) PCT Filed: Oct. 10, 2018

(86) PCT No.: PCT/KR2018/011894
§ 371 (c)(1),
(2) Date: Oct. 15, 2019

(87) PCT Pub. No.: WO2019/074269
PCT Pub. Date: Apr. 18, 2019

(65) Prior Publication Data
US 2021/0126311 A1    Apr. 29, 2021

(30) Foreign Application Priority Data
Oct. 11, 2017    (KR) .................. 10-2017-0131574

(51) Int. Cl.
*H01M 10/613*    (2014.01)
*H01M 10/653*    (2014.01)
(Continued)

(52) U.S. Cl.
CPC ..... *H01M 10/613* (2015.04); *H01M 10/0587* (2013.01); *H01M 10/653* (2015.04);
(Continued)

(58) Field of Classification Search
None
See application file for complete search history.

(56) References Cited

U.S. PATENT DOCUMENTS 7,722,984 B2    5/2010    Kim et al.
8,283,064 B2    10/2012    Kim et al.
(Continued)

FOREIGN PATENT DOCUMENTS

CN    203690368 U    7/2014
EP    2 273 601 A1    1/2011
(Continued)

OTHER PUBLICATIONS

Extended European Search Report dated May 19, 2020, for European Application No. 18866137.5.
(Continued)

*Primary Examiner* — Jonathan G Leong
*Assistant Examiner* — Tony S Chuo
(74) *Attorney, Agent, or Firm* — Birch, Stewart, Kolasch & Birch, LLP

(57) ABSTRACT

A battery cell having an electrode main body, in which a positive electrode and a negative electrode, each having an electrode mixture is coated on at least one surface of a metallic current collector, and a separation film interposed between the positive electrode and the negative electrode are wound together, a metal can, which accommodates the electrode main body together with an electrolyte solution; and a sealing tape attached to an exterior surface of the electrode main body so as to fix a distal end portion of the electrode main body, the sealing tape including a heat conductive material to provide heat conduction between the electrode main body and the metal can is provided.

9 Claims, 4 Drawing Sheets

(51) Int. Cl.
  *H01M 10/654* (2014.01)
  *H01M 50/195* (2021.01)
  *H01M 50/198* (2021.01)
  *H01M 50/193* (2021.01)
  *H01M 50/197* (2021.01)
  *H01M 50/191* (2021.01)
  *H01M 10/0587* (2010.01)
  *H01M 50/119* (2021.01)

(52) U.S. Cl.
  CPC ....... *H01M 10/654* (2015.04); *H01M 50/119* (2021.01); *H01M 50/191* (2021.01); *H01M 50/193* (2021.01); *H01M 50/195* (2021.01); *H01M 50/197* (2021.01); *H01M 50/198* (2021.01)

(56) References Cited

U.S. PATENT DOCUMENTS

2002/0064706 A1* 5/2002 Zhang ................ H01M 10/613
  429/120
2004/0137323 A1 7/2004 Sato

FOREIGN PATENT DOCUMENTS

| EP | 3 018 732 A1 | 5/2016 | |
|---|---|---|---|
| JP | 10-106514 A | 4/1998 | |
| JP | 2004-14139 A | 1/2004 | |
| JP | 2009055021 A * | 3/2009 | ............ H01L 23/36 |
| JP | 5811070 B2 | 11/2015 | |
| JP | 2017-33707 A | 2/2017 | |
| JP | 2017-033707 A * | 2/2017 | ............ Y02E 60/10 |
| KR | 10-2000-0009697 A | 2/2000 | |
| KR | 10-2003-0096717 A | 12/2003 | |
| KR | 10-2005-0092605 A | 9/2005 | |
| KR | 20050092605 A * | 9/2005 | ......... H01M 10/052 |
| KR | 10-2008-0009354 A | 1/2008 | |
| KR | 10-0799866 B1 | 1/2008 | |
| KR | 10-2010-0131166 A | 12/2010 | |
| KR | 10-2016-0049713 A | 5/2016 | |

OTHER PUBLICATIONS

International Search Report for PCT/KR2018/011894 dated Feb. 1, 2019.

* cited by examiner

BATTERY CELL INCLUDING SEALING TAPE FOR ACCELERATING HEAT CONDUCTION

CROSS-REFERENCE TO RELATED APPLICATION

This application claims priority to and the benefit of Korean Patent Application No. 10-2017-0131574 filed in the Korean Intellectual Property Office on Oct. 11, 2017, the entire contents of which are incorporated herein by reference.

TECHNICAL FIELD

The present invention relates to a battery cell including a sealing tape for accelerating heat conduction.

BACKGROUND ART

As technology development and demands for mobile devices are increased, demands for a rechargeable battery as an energy source are sharply increased, among the rechargeable batteries, a lithium rechargeable battery having high energy density and discharge voltage is researched often, and is also commercialized and is widely used.

The rechargeable battery is classified into a cylindrical battery cell or a square battery cell, in which an electrode main body (or an "electrode assembly") is embedded in a cylindrical or square metal can, and a pouch-type battery cell, in which an electrode main body is mounted in a pouch-type case of an aluminum laminate sheet, according to a shape of a battery case.

Among them, the cylindrical battery cell and the square battery cell are applied to and used in various devices according to a shape characteristic.

In general, the electrode main body mounted in the cylindrical battery cell and the square battery cell is a chargeable/dischargeable power generation device formed in a structure, in which a positive electrode, a separation film, and a negative electrode are laminated, and is formed in a jelly-roll form, in which the separation film is interposed between the positive electrode and the negative electrode having an elongated sheet type, on which an electrode active material is applied, and then is wound based on a winding core.

The electrode main body having the jelly-roll form has an advantage in that manufacturing is easy and an energy density per weight is high, but has a structure, in which the positive electrode, the negative electrode, and the separation film overlap from a winding center portion in an outside direction, so that heat caused from an electrochemical reaction is easily accumulated in an inner side.

As described above, when heat is not radiated and is accumulated, a side reaction between an electrode and an electrolyte solution is accelerated, and gas generated by the side reaction causes an increase in internal pressure of the battery cell and a deformation of the electrode, thereby causing a serious problem in safety, such as electrode short-circuit, ignition, and explosion.

Accordingly, there is a high need for a technology, which is capable of preventing heat accumulation.

DISCLOSURE

Technical Problem

The present invention has been made in an effort to solve the problem in the related art, and the technical object demanded from the past.

Particularly, the present invention has been made in an effort to provide a battery cell including a sealing tape, which accommodates heat generated from an electrode main body and conducts the heat to a metal can. In the battery cell, the conduction of heat from the electrode main body to the metal can may be accelerated, thereby solving a fundamental problem in that heat is accumulated at an inner side of the electrode main body.

Technical Solution

An exemplary embodiment of the present invention provides a battery cell, including: an electrode main body, in which a positive electrode and a negative electrode, each having an electrode mixture is coated on at least one surface of a metallic current collector, and a separation film interposed between the positive electrode and the negative electrode are wound together; a metal can, which accommodates the electrode main body together with an electrolyte solution; and a sealing tape attached to an exterior surface of the electrode main body so as to fix a distal end portion of the electrode main body, the sealing tape including a heat conductive material for accelerating heat conduction between the electrode main body and the metal can.

Accordingly, the battery cell of the present invention has a structure, in which the sealing tape conducts heat of the electrode main body to the metal can and the heat conducted to the metal can is radiated to the outside, thereby preventing a problem in the related art in that the heat is accumulated in the electrode main body.

In one particular example, the sealing tape may include: a first conductive layer including the heat conductive material; and a second conductive layer having an adhesive, the second conductive layer bonding the first conductive layer to the exterior surface of the electrode main body.

The first conductive layer may include at least one material selected from a metal material and a polymer material as the heat conductive material.

As long as the metal material has heat conductivity, the metal material is not particularly limited, and the metal material may be a metal film of one metal or a metal alloy of two or more metals selected from aluminum, copper, nickel, tin, lead, and stainless steel, and may be, particularly, aluminum.

As long as the polymer material has an excellent electric insulation property and heat conductivity, the polymer material is not particularly limited, but the polymer material may include polyimide and polyethylene terephthalate, and may include, particularly, polyimide.

In one example of the first conductive layer, the first conductive layer may be a first film formed of the metal material. A thickness of the first film may be 10 μm or more and 1,000 μm or less.

When the thickness of the first film is less than 10 μm, hardness of the sealing tape is low, so that it is difficult to firmly fix a distal end portion of the electrode main body, and when the thickness of the first film is larger than 1000 μm, there is a concern in that a volume of the battery cell is increased, and even though the increase of the volume is avoided, the volume of the electrode main body is designed as small as the thickness of the first film, thereby causing a decrease in battery capacity.

In another example of the first conductive layer, the first conductive layer may include a first film formed of the metal material and a second film, which includes the polymer material and is coated on one surface or opposite surfaces of the first film, and in this case, the second film may provide electric insulation and heat conductivity.

That is, the first conductive layer may have a dual layer structure or a three-layer structure formed of the first film formed of a metal material and the second film formed of a polymer material.

A function of each layer in the multi-layer structure is obvious. The first film may play a pivotal role of heat conduction. The second film may assign an electric insulation property to prevent an electric contact between the metal can and the electrode main body.

In the multi-layer structure, a thickness of the first film may be 10 μm or more and 1,000 μm or less, and a thickness of the second film may be 1 μm or more and 100 μm or less.

When the thickness of the first film is less than 10 μm, hardness of the sealing tape is reduced, such that it is difficult to firmly fix a distal end portion of the electrode main body, and when the thickness of the first film is larger than 1,000 μm, there is a concern in that a volume of the battery cell is increased, and even though the increase of the volume is avoided, the volume of the electrode main body is designed as small as the thickness of the first film, thereby causing a decrease in battery capacity.

When the thickness of the second film is 1 μm or less, the second film may be torn or broken in correspondence to the electrode main body, which is essentially expanded during a repeated charging/discharging process, so that the thickness of the second film of 1 μm or less is not preferable, and when the thickness of the second film is larger than 100 μm, there is a concern in that a heat conduction ratio of the first conductive layer is decreased and battery capacity may be decreased similar to the first film, so that the thickness of the second film of larger than 100 μm is not preferable.

The second conductive layer may further include heat conductive pigment particles dispersed within the adhesive.

The adhesive may be a synthetic resin, such as an acryl-based adhesive, an epoxy resin, or a phenol resin, but is not limited thereto.

The heat conductive pigment particles may be aluminum, alumina, or graphite having excellent heat conductivity, and may be, particularly, aluminum.

The heat conductive pigment particles may be dispersed in a region adjacent to an interface between the second conductive layer and the first conductive layer. Accordingly, when heat is conducted to the second conductive layer, which is in contact with the electrode main body, heat conduction to the first conductive layer may be accelerated through the pigment particles.

In one particular example, the sealing tape may be attached while surrounding an entire exterior surface of the electrode main body, except for an upper end portion of the electrode main body and a lower end portion facing the upper end portion.

In another particular example, the sealing tape may be attached while surrounding an area of 5 to 60% of an entire area of an exterior surface of the electrode main body, except for an upper end portion of the electrode main body and a lower end portion facing the upper end portion.

In the meantime, the kind of battery cell is not particularly limited, but as a particular example, the battery cell may be a lithium rechargeable battery, such as a lithium-ion (Li-ion) rechargeable battery, a lithium-polymer (Li-polymer) rechargeable battery, or a lithium-ion polymer (Li-ion polymer) rechargeable battery, having an advantage of a high energy intensity, a discharge voltage, output stability, and the like.

In general, the lithium rechargeable battery may include a positive electrode, a negative electrode, a separation film, and a non-aqueous electrolyte solution including lithium salt.

The positive electrode is manufactured by applying a mixture of a positive electrode active material, a conductive material, and a binder on a positive electrode current collector and/or an extended current collecting part and then drying the mixture, and a filler may be additionally added to the mixture as necessary.

The positive electrode current collector and/or the extended current collecting part generally has a thickness of 3 to 500 μm. As long as the positive electrode current collector and the extended current collecting part do not cause a chemical change to the battery in the art and have high conductivity, the positive electrode current collector and the extended current collecting part are not particularly limited, and for example, stainless steel, aluminum, nickel, titan, baked carbon, a material formed by surface-treating a surface of aluminum or stainless steel with carbon, nickel, titan, silver, and the like, and the like may be used. The positive electrode current collector and the extended current collecting part may be formed with fine unevenness on surfaces thereof to improve adhesive strength of the positive electrode active material, and may have various forms, such as a film, a sheet, a foil, a net, a porous body, a foam, and a non-woven fabric body.

The positive electrode active material may be a layered compound, such as a lithium cobalt oxide ($LiCoO_2$) and a lithium nickel oxide ($LiNiO_2$) or a compound substituted for one or more transition metals; a lithium manganese oxide having a chemical formula, $Li_{1+x}Mn_{2-x}O_4$ (herein, x is 0 to 0.33), $LiMnO_3$, $LiMn_2O_3$, and $LiMnO_2$, a lithium copper oxide ($Li_2CuO_2$); a vanadium oxide, such as $LiV_3O_8$, $LiFe_3O_4$, $V_2O_5$, and $Cu_2V_2O_7$, a Ni site type lithium nickel oxide expressed by a chemical formula, $LiNi_{1-x}M_xO_2$ (herein, M is Co, Mn, Al, Cu, Fe, Mg, B, or Ga and x is 0.01 to 0.3), a lithium manages complex oxide expressed by a chemical formula, $LiMn_{2-x}M_xO_2$ (herein, M is Co, Ni, Fe, Cr, Zn, or Ta, and x is 0.01 to 0.1) or $Li_2Mn_3MO_8$ (herein, M is Fe, Co, Ni, Cu, or Zn); $LiMn_2O_4$, in which a part of Li of a chemical formula is substituted with alkali earth metal ion; a disulfide compound; $Fe_2(MoO_4)_3$; and the like, but is not limited thereto.

The conductive material is generally added by 1 to 30 wt % based on the entire weight of the mixture including the positive electrode active material. As long as the conductive material does not cause a chemical change to the battery in the art and has conductivity, the conductive material is not particularly limited, and for example, graphite, such as natural graphite or artificial graphite; carbon black, such as carbon black, acetylene black, ketjen black, channel black, furnace black, lamp black, and thermal black; conductive fiber, such as carbon fiber or metal fiber; metal powder, such as fluoro carbon, aluminum, and nickel powder; conductive whiskey, such as a zinc oxide and potassium titanate; a conductive metal oxide, such as a titan oxide; and a conductive material, such as polyphenylene derivatives may be used as the conductive material.

The binder is a component assisting bonding of the active material, the conductive material, and the like and binding of the current collector, and is generally added by 1 to 30 wt % based on the entire weight of the mixture including the positive electrode active material. Examples of the binder may include a poly vinylindene fluoride, polyvinyl alcohol, carboxylmethylcellulose (CMC), starch, hydroxypropylcellulose, recycled cellulose, polyvinylpyrrolidone, tetrafluoroethylene, polyethylene, polypropylene, ethylene-propylene-diene terpolymer (EPDM), EPDM sulfonation, styrene butadiene rubber, fluoro rubber, and various copolymers.

The filler is a component suppressing expansion of the positive electrode and is selectively used, and as long as the filter does not cause a chemical change to the battery in the art and is a fabric material, the filler is not particularly limited, and for example, an olefin-based polymer, such as polyethylene and polypropylene; and a fabric material, such as glass fiber and carbon fiber, are used as the filler.

The negative electrode is manufactured by applying a negative electrode active material on a negative electrode current collector and/or an extended current collecting part and drying the negative electrode active material, and the foregoing components may be selectively additionally included as necessary.

The negative electrode current collector and/or the extended current collecting part generally has a thickness of 3 to 500 μm. As long as the negative electrode current collector and the extended current collecting part do not cause a chemical change to the battery in the art and have conductivity, the negative electrode current collector and the extended current collecting part are not particularly limited, and for example, copper, stainless steel, aluminum, nickel, titan, baked carbon, a material formed by surface-treating a surface of copper or stainless steel with carbon, nickel, titan, silver, and the like, an aluminum-cadmium alloy, and the like may be used. Further, similar to the positive current collector, the negative electrode current collector and the extended current collecting part may be formed with fine unevenness on surfaces thereof to improve adhesive strength of the negative electrode active material, and may be used in various forms, such as a film, a sheet, a foil, a net, a porous body, a foam, and a non-woven fabric body.

As the negative electrode active material, for example, carbon, such as hard carbon and graphite carbon; a metal complex oxide, such as $Li_xFe_2O_3$ (0≤x≤1), $Li_xWO_2$ (0≤x≤1), $Sn_xMe_{1-x}Me'_yO$, (Me: Mn, Fe, Pb, Ge; Me': Al, B, P, Si, Group 1, 2, and 3 elements of the periodic table, halogen; 0<x≤1; 1≤y≤3; 1≤z≤8), lithium metal; a lithium alloy, a silicon based alloy, a tin based alloy; a metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; a conductive polymer, such as polyacetylene; and Li—Co—Ni-based material may be used.

The separation film is interposed between the positive electrode and the negative electrode, and an insulative thin film having high ion transmittance and mechanical strength is used. A pore diameter of the separation film is generally 0.01 to 10 μm, and a thickness of the separation film is generally 5 to 300 μm. As the separation film, for example, an olefin-based polymer, such as chemically resistant and hydrophobic polypropylene; a sheet or a non-woven fabric formed of glass fiber, polyethylene, or the like, and the like are used. When a solid electrolyte, such as a polymer, is used as an electrolyte, the solid electrolyte may also serve as the separation film.

The electrolyte solution may be a non-aqueous electrolyte solution including lithium salt, and is formed of a non-aqueous electrolyte solution and lithium salt. As the non-aqueous electrolyte solution, a non-aqueous organic solvent, an organic solid electrolyte, an inorganic solid electrolyte, and the like are used, but the non-aqueous electrolyte solution is not limited thereto.

As the non-aqueous organic solution, for example, a non-protogenic organic solvent, such as N-methyl-2-pyrrolidinone, propylene carbonate, ethylene carbonate, butylene carbonate, dimethyl carbonate, diethyl carbonate, gamma-bytyrolactone, 1,2-dimetoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphate triester, trimethoxy methane, dioxolane derivatives, sulfolane, methyl sulfolane, 1,3-dimethyl-2-imidazolidinone, polypropylene carbonate derivatives, tetrahydrofuran derivatives, ether, methyl propionate, and ethyl propionate may be used.

As the organic solid electrolyte, for example, polyethylene derivatives, polyethylene oxide derivatives, polypropylene oxide derivatives, a phosphate ester polymer, poly agitation lysine, polyester sulfide, polyvinyl alcohol, poly vinylidene fluoride, and a polymer including an ionic dissociable group may be used.

As the inorganic solid electrolyte, for example, a nitride of Li, such as $Li_3N$, LiI, $Li_5NI_2$, $Li_3N$—LiI—LiOH, $LiSiO_4$, $Li_2SiS_3$, $Li_4SiO_4$, $Li_4SiO_4$—LiI—LiOH, and $Li_3PO_4L_2S$—$SiS_2$, a halide, and a sulphate may be used. The lithium salt is a material dissolved well in the non-aqueous electrolyte, and for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloro borane lithium, lower aliphatic carbonic acid lithium, 4 phenyl lithium borate, and imide may be used.

Further, the non-aqueous electrolyte solution aims to improve a charging/discharging characteristic, flame retardancy, and the like, and for example, pyridine, triethylphosphite, triethanolamine, annular ether, ethylene diamine, n-glyme, hexa phosphoric acid tri amide, nitrobenzene derivatives, sulfur, quinoneimine dye, N-substituted oxazolidinone, N,N-substituted imidazolidine, ethylene glycol dialkyl ether, ammonium salt, pyrrole, 2-metoxy ethanol, and aluminum trichloride may be added. Depending on the case, in order to assign noninflammability, a solvent including halogen, such as carbon tetrachloride and trifluoroethylene, may be further included, and in order to improve a high temperature preservation characteristic, carbon dioxide gas may be further included, and fluoro-ethylene carbonate (FEC), propene sultone (PRS), and the like may be further included.

In one particular example, the non-aqueous electrolyte including lithium salt may be prepared by adding lithium salt, such as $LiPF_6$, $LiClO_4$, $LiBF_4$, and $LiN(SO_2CF_3)_2$, to a mixed solvent of annular carbonate of EC or PC, which is a high-dielectric solvent, and a linear carbonate of DEC, DMC, or EMC, which is a low-viscosity solvent.

Advantageous Effects

As described above, the battery cell according to the present invention includes the sealing tape, which is capable of accelerating heat conduction, so that the sealing tape conducts heat of the electrode main body to the metal can and the heat conducted to the metal can is radiated to the outside, thereby suppressing a heat accumulation phenomenon of the electrode main body.

MODE FOR INVENTION

Figure 1:
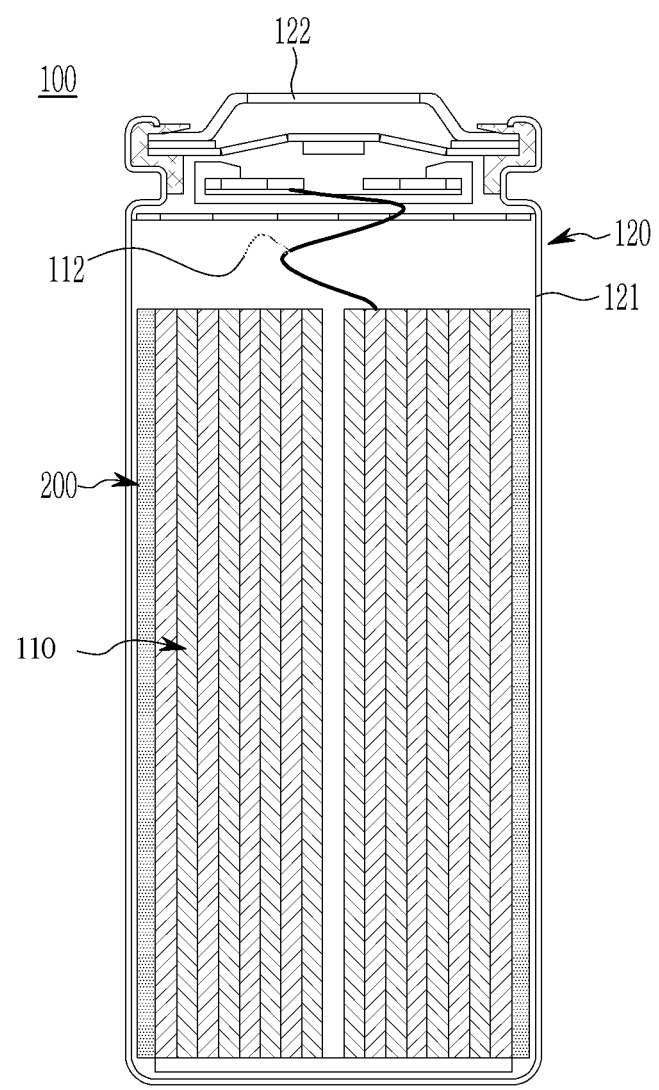
FIG. 1 is a schematic diagram of a battery cell according to one exemplary embodiment of the present invention.

Hereinafter, exemplary embodiments of the present invention will be described with reference to the accompanying drawings. However, in explaining the present description, the description of an already publicly known function or configuration will be omitted for clarify the main point of the present description.

A part irrelevant to the description will be omitted to clearly describe the present invention, and the same elements will be designated by the same reference numerals throughout the specification. In addition, the size and thickness of each configuration shown in the drawings are arbitrarily shown for understanding and ease of description, but the present invention is not limited thereto.

FIG. 1 is a schematic diagram of a battery cell according to one exemplary embodiment of the present invention.

Referring to FIG. 1, a battery cell 100 may include a metal can 120, an electrode main body 110 accommodated inside the metal can 120, and a sealing tape 200 fixing the electrode main body 110.

The metal can 120 may include a container part 121 and a cap assembly 122 coupled to the container part 121 at an upper end of the container part 121.

The electrode main body 110 may have a jelly-roll form wound in the state where an isolation film is interposed between a positive electrode and a negative electrode.

A positive electrode lead 112 is attached to the positive electrode, so that the positive electrode is connected to the cap assembly 122 through the positive electrode lead 112, and a negative electrode lead (not illustrated) is attached to the negative electrode, so that the negative electrode is connected to a lower end of the metal can 120 through the negative electrode lead.

In the battery cell 100 according to FIG. 1, the sealing tape 200 is attached to an entire exterior surface, that is a lateral surface of the electrode main body 110, except for an upper surface and a lower surface facing the upper surface, from which the positive electrode lead 112 and the negative electrode lead protrude, respectively.

Depending on the case, the sealing tape 200 may also be attached in the form surrounding an outer circumferential surface of the electrode main body 110 and a distal end portion of the electrode main body 110 while having predetermined margins from the upper surface and the lower surface in opposite directions.

Accordingly, the sealing tape 200 is positioned between the metal can 120 and the lateral surface of the electrode main body 110, and heat of the electrode main body 110 is conducted to the metal can 120 via the sealing tape 200.

Thereafter, the heat accommodated in the metal can 120 may be radiated by an external cooling means, for example, a circulation of air or a liquid refrigerant.

As described above, the conduction of the heat via the sealing tape 200 results from excellent heat conductivity, particularly, heat conductivity of 1,000 W/mk or more, of the sealing tape 200, and a structure of the sealing tape 200 having heat conductivity will be described in detail with reference to FIGS. 2 to 4.

Figure 2:
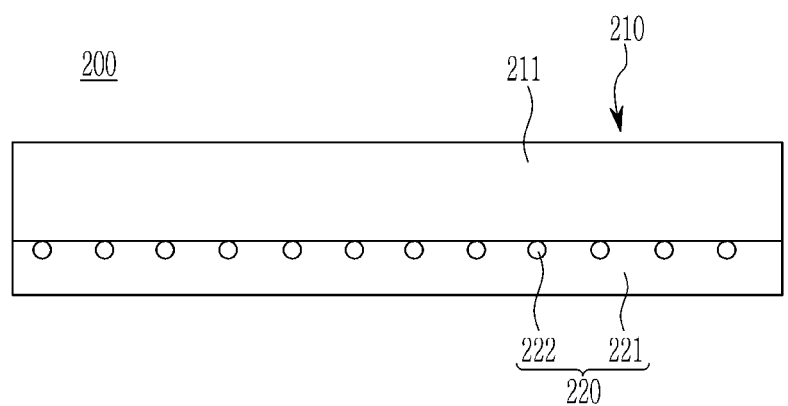
FIG. 2 is a vertical cross-sectional view of a sealing tape according to one exemplary embodiment of the present invention.

First, referring to FIG. 2, the sealing tape 200 includes a first conductive layer 210, which includes a heat conductive material and is in contact with an internal surface of the container part 121 of the metal can 120, and a second conductive layer 220, which includes an adhesive 221 bonding the first conductive layer 210 to the exterior surface of the electrode main body 110. The second conductive layer 220 may have the form, in which the adhesive 221 has a solid phase or fluidity with predetermined viscosity.

The first conductive layer 210 may have the form of a first thin film 211 including a metal material, particularly, aluminum, as a heat conductive material. The first thin film 211 may have a thickness of about 500 μm.

The second conductive layer 220 may include heat conductive pigment particles 222 dispersed within the adhesive 221.

The heat conductive pigment particles 222 may be aluminum having excellent heat conductivity, and may be dispersed in a region adjacent to an interface of the second conductive layer 220 and the first conductive layer 210.

Accordingly, when heat is conducted to the second conductive layer 220, which is in contact with the electrode main body 110, the heat conduction to the first conductive layer 210 may be accelerated through the pigment particles 222.

Figure 3:
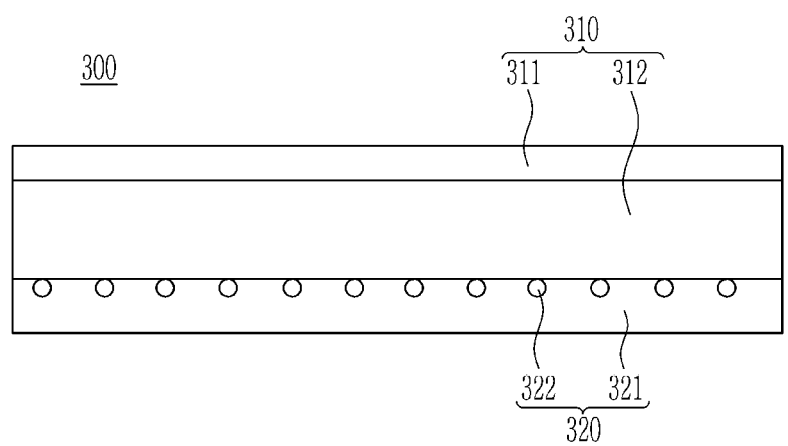
FIG. 3 is a vertical cross-sectional view of a sealing tape according to another exemplary embodiment of the present invention.

FIG. 3 is a vertical cross-sectional view of a sealing tape 300 according to another exemplary embodiment.

Referring to FIG. 3, the sealing tape 300 includes a first conductive layer 310, which includes a heat conductive material and is in contact with an internal surface of the container part 121 of the metal can 120, and a second conductive layer 320, which includes an adhesive 321 and bonds the first conductive layer 310 to the exterior surface of the electrode main body 110.

The first conductive layer 310 is formed of a first thin film 311 including a metal material, particularly, aluminum, as a heat conductive material, and a second thin film 312, which includes a polymer material, particularly, polyimide, and is coated on one surface of the first thin film 311. However, the second thin film 312 may be in close contact with the internal surface of the container part 121 of the metal can 120.

That is, the first conductive layer 310 may have a dual layer structure formed of the first thin film 311 formed of a metal material and a second thin film 312 formed of a polymer material.

A function of each layer in the multi-layer structure is obvious. The first thin film 311 may play a pivotal role of heat conduction. The second thin film 312 may assign an electric insulation property and prevent an electric contact between the metal can 120 and the electrode main body 110, more particularly, the container part 121 of the metal can 120 and the electrode main body 110.

A thickness of the first thin film 311 may be about 500 μm or less, and a thickness of the second thin film 312 may be about 10 μm.

The second conductive layer 320 may further include heat conductive pigment particles 322 dispersed within the adhesive 321.

The heat conductive pigment particles 322 may be aluminum having excellent heat conductivity, and may be dispersed in a region adjacent to an interface of the second conductive layer 320 and the first conductive layer 310.

Accordingly, when heat is conducted to the second conductive layer 320, which is in contact with the electrode main body 110, the heat conduction to the first conductive layer 310 may be accelerated through the pigment particles 322.

Figure 4:
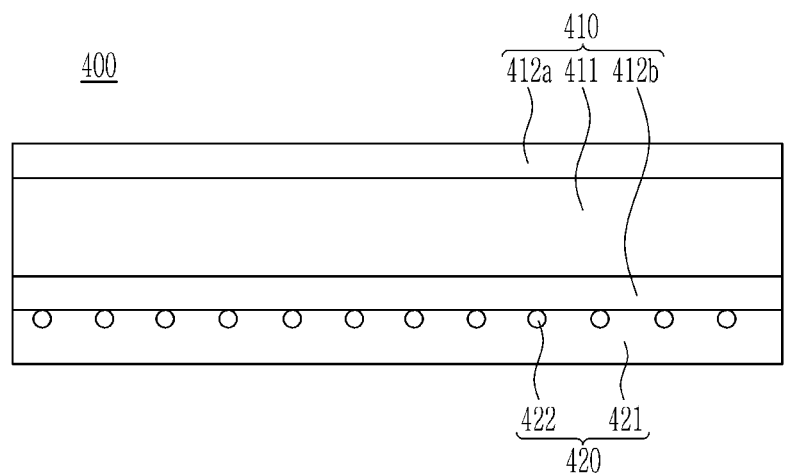
FIG. 4 is a vertical cross-sectional view of a sealing tape according to another exemplary embodiment of the present invention.

FIG. 4 is a vertical cross-sectional view of a sealing tape 400 according to another exemplary embodiment.

Referring to FIG. 4, the sealing tape 400 includes a first conductive layer 410, which includes a heat conductive material and is in contact with an internal surface of the container part 121 of the metal can 120, and a second conductive layer 420, which includes an adhesive 421 and bonds the first conductive layer 410 to the exterior surface of the electrode main body 110.

The first conductive layer 410 is formed of a first thin film 411 including a metal material, particularly, aluminum, as a heat conductive material, and second thin films 412a and 412b, which include a polymer material, particularly, polyimide, and are coated on both surfaces of the first thin film 411.

Accordingly, one 412a positioned at the outermost side between the second thin films 412a and 412b may be in close contact with the internal surface of the container part 121 of the metal can 120, and the other one 412b may be in contact with the second conductive layer 420.

That is, the first conductive layer 410 may have a multi-layer structure formed of the first thin film 411 formed of a metal material and the second thin films 412a and 412b formed of a polymer material.

A function of each layer in the multi-layer structure is obvious.

First, the first thin film 411 may play a pivotal role of heat conduction.

The second thin film 412a, which is in close contact with the internal surface of the container part 121 of the metal can 120 may secure an electric insulation property and prevent an electric contact between the metal can 120 and the electrode main body 110.

In the meantime, the first thin film 411 is in contact with the electrode main body 110 with the second conductive layer 420 interposed therebetween, which, however, does not completely secure the electric insulation property of the first thin film 411 for the electrode main body 110, so that the second thin film 412b, which is in contact with the second conductive layer 420, may further improve the electric insulation property of the first thin film 411 for the electrode main body 110.

A thickness of the first thin film 411 may be about 500 μm or less, and a thickness of the second thin film 412 may be about 10 μm.

The second conductive layer 420 may include heat conductive pigment particles 422 dispersed within the adhesive 421.

The heat conductive pigment particles 422 may be aluminum having excellent heat conductivity, and may be dispersed in a region adjacent to an interface of the second conductive layer 420 and the first conductive layer 410.

Accordingly, when heat is conducted to the second conductive layer 420, which is in contact with the electrode main body 110, the heat conduction to the first conductive layer 410 may be accelerated through the pigment particles 422.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

The invention claimed is:

1. A battery cell, comprising:
   an electrode main body, in which a positive electrode and a negative electrode, each having an electrode mixture is coated on at least one surface of a metallic current collector, and a separation film interposed between the positive electrode and the negative electrode are wound together;
   a cylindrical metal can, which accommodates the electrode main body together with an electrolyte solution, the cylindrical metal can having an open end;
   a cap assembly closing the open end of the cylindrical metal can; and
   a sealing tape attached to an exterior surface of the electrode main body so as to fix a distal end portion of the electrode main body, the sealing tape including a heat conductive material for accelerating heat conduction between the electrode main body and the metal can,
   wherein the sealing tape includes:
      a first conductive layer including the heat conductive material, the first conductive layer being a first film consisting of a metal material directly contacting an interior surface of the cylindrical metal can; and
      a second conductive layer having an adhesive and heat conductive pigment particles dispersed within the adhesive, the second conductive layer bonding the first conductive layer to the exterior surface of the electrode main body, and all of the heat conductive pigment particles are dispersed in a region adjacent to an interface between the second conductive layer and the first conductive layer.

2. The battery cell of claim 1, wherein:
   the first conductive layer includes a second film, which includes a polymer material and is coated on one surface the first film between the metal material and the second conductive layer, and
   the second film provides electric insulation and heat conductivity.

3. The battery cell of claim 2, wherein:
   a thickness of the first film is 10 μm or more and 1,000 μm or less, and
   a thickness of the second film is 1 μm or more and 100 μm or less.

4. The battery cell of claim 1, wherein:
   the metal material is a metal film including one metal or a metal alloy including two or more metals selected from aluminum, copper, nickel, tin, lead, and stainless steel.

5. The battery cell of claim 1, wherein:
   the heat conductive pigment particles are aluminum, alumina, or graphite.

6. The battery cell of claim 1, further comprising an electrode lead extending from an upper end portion of the electrode main body, and
   wherein:
      the sealing tape is attached while surrounding an entire exterior surface of the electrode main body, except for the upper end portion of the electrode main body and a lower end portion facing the upper end portion.

7. The battery cell of claim 1, further comprising an electrode lead extending from an upper end portion of the electrode main body, and
   wherein:
      the sealing tape is attached while surrounding an area of 5 to 60% of an entire area of an exterior surface of the electrode main body, except for the upper end portion of the electrode main body and a lower end portion facing the upper end portion.

8. A battery cell, comprising:
an electrode main body, in which a positive electrode and a negative electrode, each having an electrode mixture is coated on at least one surface of a metallic current collector, and a separation film interposed between the positive electrode and the negative electrode are wound together;
a cylindrical metal can, which accommodates the electrode main body together with an electrolyte solution, the cylindrical metal can having an open end;
a cap assembly closing the open end of the cylindrical metal can; and
a sealing tape attached to an exterior surface of the electrode main body so as to fix a distal end portion of the electrode main body, the sealing tape including a heat conductive material for accelerating heat conduction between the electrode main body and the metal can,
wherein the sealing tape includes:
a first conductive layer including the heat conductive material, the first conductive layer being a first film consisting of a metal material directly contacting an inner surface of the cylindrical metal can; and
a second conductive layer having an adhesive and heat conductive pigment particles dispersed in the adhesive, the second conductive layer bonding the first conductive layer to the exterior surface of the electrode main body.

9. The battery cell of claim 8, wherein:
a thickness of the first film is 10 μm or more and 1,000 μm or less.

* * * * *